United States Patent [19]
Audeh et al.

[11] Patent Number: 5,466,363
[45] Date of Patent: Nov. 14, 1995

[54] INTEGRATED PROCESS FOR HYDROTREATING HEAVY OIL, THEN MANUFACTURING AN ALLOY OR STEEL USING A CARBON-BASED CATALYST

[75] Inventors: Costandi A. Audeh, Princeton; Lillian A. Rankel, Pennington, N.J.

[73] Assignee: Mobil Oil Corporation, Fairfax, Va.

[21] Appl. No.: 194,598

[22] Filed: Feb. 10, 1994

[51] Int. Cl.⁶ .................................................. C10G 45/04
[52] U.S. Cl. ........................... 208/251 H; 208/52 CT; 208/307; 208/253; 420/129; 420/590; 48/198.2
[58] Field of Search .................... 420/129, 590; 252/373; 208/251 H, 307, 52 C T; 48/198.2, 197

[56] References Cited

U.S. PATENT DOCUMENTS

| | | | |
|---|---|---|---|
| 4,016,104 | 4/1977 | Marion | 48/197 R |
| 4,436,530 | 3/1984 | Child et al. | 48/197 |
| 4,883,499 | 11/1989 | Beierle et al. | 48/203 |
| 5,066,325 | 11/1991 | Lehto | 75/499 |

*Primary Examiner*—Helane Myers
*Attorney, Agent, or Firm*—Alexander J. McKillop; Dennis P. Santini; Gerald L. Harris

[57] ABSTRACT

Use of a carbon-based catalyst composition, particularly activated-carbon, optionally containing at least one metal selected from Ni, Co, Mo, W, Fe, or mixtures thereof, for heavy oil hydroprocessing. Recovery and partial gasification of the catalyst to produce a synthesis gas and a partially gasified catalyst residue. Use of the synthesis gas in a process to produce synthetic hydrocarbons and use of the catalyst residue in steel or alloy production. Catalysts used for heavy oil hydrocarbon hydroprocessing frequently become contaminated with metals which increase the cost of disposal of the spent catalysts, e.g. landfills. This invention uses a specific catalyst for hydroprocessing which can then be partially gasified to produce a catalyst residue which can be further used in steel or alloy production, thereby reducing the need for expensive disposal.

20 Claims, No Drawings

INTEGRATED PROCESS FOR HYDROTREATING HEAVY OIL, THEN MANUFACTURING AN ALLOY OR STEEL USING A CARBON-BASED CATALYST

FIELD OF THE INVENTION

This invention is directed to the use of a carbon-based catalyst composition for hydrocarbon upgrading or hydroprocessing, recovery of the catalyst composition, partial gasification of the recovered catalyst to produce synthesis gas and a partially gasified catalyst, and use of the partially gasified catalyst" in alloy or steel production.

BACKGROUND OF THE INVENTION

As high quality crude oils are depleted, an inexpensive substitute for use as petroleum refinery feedstock becomes more desirable. One such substitute is petroleum residue, or heavy oil, such as that produced from the straight run distillation of crude oil. Another substitute for high quality crude oils are heavier crude oils.

The world's supply of light, sweet crudes has greatly diminished in recent years. Refiners have been forced to deal with ever heavier crudes, containing significantly more metals, while still producing a full spectrum of products. Much of the problem of upgrading these heavier stocks is due to the presence of so much metal, usually nickel and vanadium. The presence of large amounts of metal, usually in association with asphaltenes, presents a formidable upgrading challenge. Some of the worst of these materials are "heavy crudes" while almost as bad are somewhat lighter crudes which contain less asphalt, but even more metal. Each type of resource will be briefly reviewed.

Heavy Crudes

Extensive reserves of petroleum in the form of so-called "heavy crudes" exist in a number of countries, including Western Canada, Venezuela, Russia, the United States and elsewhere. Many of these reserves are located in relatively inaccessible geographic regions. The United Nations Institute For Training And Research (UNITAR) has defined heavy crudes as those having an API gravity of less than 20, suggesting a high content of polynuclear compounds and a relatively low hydrogen content. The term "heavy oil" whenever used in this specification means an oil having an API gravity of less than 20 and includes both heavy crude oil and heavy petroleum fractions such as petroleum residue produced from the distillation of crude oil. In addition to a high specific gravity, heavy crudes in general have other properties in common including a high content of metals, nitrogen, sulfur and oxygen, and a high Conradson Carbon Residue (CCR). The heavy crudes generally are not fluid at ambient temperatures and do not meet local specifications for pipeline transport. It has been speculated that such crudes have resulted from microbial action which consumed alkanes leaving behind the heavier, more complex structures which are now present.

High Metal Content Crudes

Although considerably lighter than the "heavy crudes", the high metal content crudes such as Maya and some Venezuelan crudes present similar processing difficulties. The high metals crudes are those which are difficult to process by conventional catalytic methods such that at least the highest boiling portions of these crudes are thermally upgraded by coking or visbreaking. Generally the heaviest fractions, which contain most of the metal, are separated from the lighter fractions by fractionation or vacuum distillation to recover a gas oil or vacuum gas oil and lighter fractions which with difficulty can be upgraded catalytically.

Unfortunately, the lighter fractions obtained from high metals crudes still contain relatively large amounts of metals. Although the gas oil and vacuum gas oil fractions can be upgraded in, e.g., an FCC, the metal content of such gas oils is so high that some form of metals passivation, or hydrotreating of the feed to remove metals, is usually necessary.

Heavy oils are not extensively used as a refinery feed in part because their viscosity is too high for transporting through a pipeline and in part because their metals content, especially nickel and vanadium, is too high. Nickel and vanadium typically are present as stable nitrogen complexes in the form of porphyrins, which cause severe refinery problems, poison catalysts and are detrimental to the quality of finished products.

The progressive depletion and rising cost of high quality crudes has created a need for a process for inexpensively converting heavy oils to pipeline transportable syncrudes, preferably in a way that will not make downstream processing operations more difficult. Such a process would augment the supply of available crude and would make it possible for refiners to blend syncrude with a more conventional feed for catalytic cracking and hydrocracking. The process of this invention would also be useful to improve the quality of hydrocarbon feedstocks inside a petroleum refinery.

Heavy oils can be pumped through heated pipelines but this requires the expenditure of a considerable amount of energy. Hence, heavy oils are usually treated by processes such as visbreaking, coking and deasphalting. A description of these processes may be found in Modern Petroleum Technology, Fourth Edition, edited by Hobson & Pohl, pp. 281 to 288 and 422 to 423.

However, these processes are accompanied by certain drawbacks. Visbreaking, i.e., viscosity breaking, is a relatively mild thermal cracking process which yields reduced viscosity products. However, with most heavy oils conventional visbreaking yields incompatible two phase products. Coking is a more severe thermal cracking process which converts residual oils such as pitch and tar into gas, naphtha, heating oil, gas oil and coke. Coking requires a large refinery operation. Deasphalting produces low yields of pipeline transportable oil.

Fractionation to concentrate the lighter portions of the whole crude is somewhat effective but the fractionation itself changes the crude causing metals to migrate into the lighter fractions. The gas oil or vacuum gas oil fractions obtained by fractionation are believed to be more contaminated with metal than can be accounted for by assuming that all, or almost all, of the metals are associated with the asphaltic residual portion of the crude.

Hydrotreatment has been used as a method for upgrading heavy oil and catalysts employed therein include CoMo/alumina and activated carbon.

U.S. Pat. No. 3,715,303 discloses the use of activated carbon as a catalyst in the hydrotreatment of residual hydrocarbons. A required component of the catalyst described therein is an alkali or alkaline earth metal compound such as potassium hydroxide to render the catalyst basic.

U.S. Pat. No. 3,812,028 discloses the use of an activated carbon catalyst for the hydrotreatment of a feed containing polynuclear aromatic compounds by passing the feed through a reaction zone maintained at an elevated temperature and at a hydrogen partial pressure in excess of 2,200 psig, and including a catalyst composited of activated carbon and a metallic component.

U.S. Pat. No. 4,518,488 discloses a process for hydrotreating feedstocks containing asphaltenes using a catalyst composited from a porous carbon matrix with a uniform dispersion of metal thereon.

U.S. Pat. No. 4,988,434 discloses a process for reducing metal contaminants in a hydrocarbonaceous liquid, e.g., atmospheric bottoms, by contacting the liquid with an activated-carbon supported catalyst.

Heavy oils can also be hydroprocessed over CoMo/carbon catalysts. For details, see "Hydroprocessing of Heavy Oils over CoMo/Carbon Supported Catalysts," L. A. Rankel, Energy & Fuels, Vol. 6, No. 6, 937–942, American Chemical Society (1993), which is incorporated by reference herein.

Where catalyst regeneration is possible and economically attractive, the catalysts are typically regenerated and reused. However, frequently, the catalysts cannot be economically regenerated to the needed level of activity and are considered unregenerable. These unregenerable catalysts are typically termed "spent" catalysts. The spent catalysts must be disposed of, frequently at great expense. For example, if the spent catalysts contain one or more heavy metals, the spent catalysts may need to be disposed of in an expensive landfill or may need to be handled in some other expensive manner.

It is desired to develop an economically attractive method to dispose of these spent catalysts.

Catalyst Gasification

Processes are known for converting coal and other hydrocarbons, such as natural gas, to a gaseous mixture comprising hydrogen and carbon monoxide and/or carbon dioxide, e.g. synthesis gas. Those of major importance depend either on the partial combustion of a fuel with a source of oxygen or on the high temperature reaction of the fuel with steam, or a combination of these two reactions. An excellent summary of the art of gas manufacture, including synthesis gas production, from solid and liquid fuels is given in the Encyclopedia of Chemical Technology, edited by Kirk-Othmer, Third Edition, Volume 11, pages 410–446 (1980), John Wiley and Sons, New York, N.Y., incorporated by reference herein.

Hydrocarbon Synthesis

It is also known that synthesis gas will undergo conversion to reduction products of carbon monoxide, such as hydrocarbons, at a temperature of from about 300° F. to about 850° F. under from about one to about one thousand atmospheres pressure, over a fairly wide range of catalysts. The Fischer-Tropsch (F-T) process, for example, which has been most extensively studied, produces a range of liquid hydrocarbons, a portion of which have been used as low octane gasoline. Catalysts that have been studied for this and related processes include those based on iron, cobalt, nickel, ruthenium, thorium, rhodium, and osmium, or their oxides. The wide range of catalysts and catalyst modifications disclosed in the art and an equally wide range of conversion conditions for the reduction of carbon monoxide by hydrogen provide some flexibility toward obtaining selected types of products, and some control over their molecular weight distribution. Ruthenium catalyst, for example, is capable of producing linear hydrocarbons exclusively, while "promoted iron" also produces oxygenates. Examples of patents describing Fischer-Tropsch type processes include U.S. Pat. Nos. 4,269,783; 4,252,736; 4,304,871; 4,617,288; 4,686,313; and 4,978,689, the contents of which are incorporated by reference herein.

In addition, CO and $H_2O$ can be used to hydroprocess aromatic containing feeds, thus providing one more use for CO. For details, see "Using CO/Water to Hydroprocess Aromatic Containing Feeds, "L. A. Rankel, Energy & Fuels, Vol 6, No. 6, 826–830, American Chemical Society (1992), which is incorporated by reference herein.

Production of Steel

Production of steel, particularly specialty steels, requires the addition of carbon and a variety of metals, depending on the specific grade and type of steel to be produced. For example, various steels require the addition of one or more metals, such as nickel, molybdenum, cobalt, tungsten, and vanadium. These metals are particularly useful in the production of high temperature alloys, especially nickel-base superalloys, see, e.g. IN-100™. A description of high temperature alloys is given in the Encyclopedia of Chemical Technology, edited by Kirk-Othmer, Third Edition, Volume 12, pages 417–458 (1980), John Wiley and Sons, New York, N.Y., incorporated by reference herein.

An excellent general description of steel composition and manufacture, including specialty alloys, is given in the Encyclopedia of Chemical Technology, edited by Kirk-Othmer, Third Edition, Volume 21, pages 552–625 (1980), John Wiley and Sons, New York, N.Y., incorporated by reference herein.

It is desired to develop an economically attractive source of metals that can be added to enhance steel and alloy production.

SUMMARY OF THE INVENTION

This invention is a novel integrated process where carbon or carbon supported metal catalyst compositions which were used for a variety of processes, such as hydrocarbon upgrading or hydroprocessing, are then gasified in a controlled manner to produce synthesis gas, e.g. CO and $H_2$, and to produce a partially gasified catalyst containing metals and carbon that can be used in the manufacture of specialty steel and alloys.

Application of this novel process can produce heavy oil demetallation and upgrading with carbon based catalysts while eliminating the disposal costs associated with catalyst landfilling. Instead, as a part of this invention, the carbon catalysts are partially gasified with sufficient oxygen and/or steam to produce a synthesis gas comprising CO and $H_2$, which is a useful starting material for hydrocarbon synthesis or hydroprocessing aromatic containing feeds. Then the resulting partially gasified catalyst is recovered and is used in the production of specialty steel.

The use of spent metals-containing carbon catalysts for steel or alloy manufacturing not only reduces the need for expensive disposal, but also eliminates any potential pollution of the environment by improper catalyst landfilling or disposal.

Catalysts useful in this invention include the activated carbons Darco® carbon, Petrodarco A™ carbon, Alfa™ carbon, Norit® ROX 0.8 carbon, and other lignite coal based activated carbons, both neat, unimpregnated, or containing one or more metals or metal oxides, such as molybdenum, cobalt, tungsten, nickel, and vanadium.

DETAILED DESCRIPTION

In accordance with the present invention, a heavy hydrocarbon oil is upgraded by a hydrotreating process using a carbon based catalyst composition. As indicated above, by "heavy oil" or "heavy hydrocarbon oil" is generally meant a hydrocarbon oil with an API gravity of less than about 20. The hydrocarbon oil undergoes Visbreaking, demetallation, and reduction of carbon residue (as measured by the Conradson Carbon Residue test, CCR). Some desulfurization and asphaltene conversion also occurs. The upgraded product can then be used as feed to a fluid catalytic cracker (FCC) or other hydrocarbon conversion process or can be injected into a pipeline for transport. The spent carbon based catalyst is recovered from the hydrotreating process and is then partially gasified using steam and/or a source of oxygen to produce synthesis gas and to produce a partially gasified catalyst residue. The synthesis gas may then be directed to a hydrocarbon synthesis process, such as Fischer-Tropsch or used to hydrogenate aromatic containing feeds. The partially gasified catalyst residue is recovered and is used in the manufacture of an alloy or specialty steel. Details on each aspect of this invention are provided below.

Feedstock

The heavy hydrocarbon oil feedstock used in the present invention can be, for example, heavy crude oil, vacuum or atmospheric distillation residuum or various other fossil fuels such as tars and oil or shale oil. Light oils can also be treated with the catalyst composition of the present invention to reduce the content of unwanted metals such as nickel and vanadium.

The soluble components of the hydrocarbon feedstock include all of the light components of the crude and the heavier components which are readily soluble in aliphatic solvents. Asphaltenes are generally insoluble in aliphatic solvents. The asphaltene fraction from a whole heavy crude can contain almost all of the metals depending upon the solvent used for deasphalting. The maltene fraction will have a greatly reduced metals content compared to the asphaltene fraction. The maltenes are somewhat soluble in aliphatic solvents, depending on deasphalting conditions.

The heavy oils contemplated for use herein have very little light components boiling below 650° F. and an abundance of 650° F.$^+$ material and asphaltenes. In general terms, the heavy oils contemplated for use herein will have a 50 wt. % boiling point at atmospheric pressure in excess of about 650° F. Frequently, the 40% and even the 30 volume % boiling points of such heavy oils will exceed 1000° F. such that the heavy oils will be considered non-distillable.

Most heavy crudes are asphaltenic in nature but a few are not. Asphaltenic crudes contain a high proportion of naphthenic and aromatic components and a low paraffin content and are characterized by a low API gravity, e.g., of less than about 30 for the whole crude and less than about 20 API gravity for the 650° F.$^+$ fraction. Whole crudes have a CCR content usually in excess of about 10 wt. % and a pentane insoluble asphaltene content of at least about 10 wt. % (using 10:1 pentane:oil). Many of the heavy crudes have a specific gravity above about 0.9. The 650° F.$^+$ fraction of some heavy crudes is so heavy that the specific gravity is about 1.0 (an API gravity of less than about 10) and will sink, not float, in water.

The heavy oils generally contain large amounts of metals such as nickel and vanadium, much, and usually most of which, are coordinated by porphyrin or "porphyrin like" structures. These porphyrins or "porphyrin like" structures coordinate Ni and V in complex aromatic structures that are asphaltic in nature. Typically, heavy oils contain more than 5 ppm by weight of Ni and more than 25 ppm by weight of V on a whole crude basis. The porphyrins undergo degradation reactions which disrupt the aromaticity of the porphyrin rings and transform metal-coordinated porphyrin or metalloporphyrins into metal-coordinated polypyrrolic species. More details on such heavy crudes and porphyrin degradation reactions are provided in "Degradation of Metalloporphyrins in Heavy Oils Before and During Processing", L. A. Rankel Fossil Fuels Geochemistry, Characterization & Processing, ACS Symposium Series No. 344, Chapter 16, (ACS) 1987 ed. R. H. Filby and J. F. Branthaver, which is incorporated herein by reference.

Typical feedstocks include atmospheric residues from Maya and Arabian Heavy crude oils as will be further described below.

Typical levels of (Ni+V) in the heavy oils contemplated for use herein will exceed 50 wt ppm (total Ni+V), and frequently will exceed 100 or even 150 wt ppm (Ni+V) based on the whole crude. There is no physical upper limit on metals concentrations contemplated for use herein.

The heavy oils usually contain relatively large amounts of sulfur which is advantageously reduced by the method of the present invention.

Reaction Conditions

The reactor can be of the fixed bed type or a fluidized or moving bed reactor. A trickle bed type reactor is preferred.

Processing may be carried out at a temperature of from about 500° F. to about 1,200° F., a pressure of from about 0 psig to about 4,000 psig, and a weight hourly space velocity (WHSV) of from about 0.1 to about 10 hr$^{-1}$.

Processing conditions preferably include a temperature range of from about 600° to about 1,000° F., a pressure of from 500 to about 2,500 psig, and a WHSV of from about 0.2 to about 5 hr$^{-1}$.

Hydrogen circulation can range from about zero to about 40,000 SCF H$_2$/bbl of feed depending on hydrogenation activity. Typically, the range of hydrogen consumption of the present method is from about 300 SCF/bbl to about 6,000 SCF/bbl.

The feed is initially heated to render it fluid so that it can be pumped into the reactor.

Hydrotreating Catalyst

The activated carbon hydrotreating catalyst composition of the present invention may be any neat or unmodified activated carbon or an activated carbon that has been impregnated with one or more metals that are suitable for hydrotreating, non-limiting examples of which include cobalt, nickel, tungsten, molybdenum, iron, and mixtures thereof. Typical activated carbons include Darco® carbon, Petrodarco A™ carbon, Alfa™ carbon, and Norit® ROX 0.8 carbon.

Useful activated carbon catalysts typically possess a pore volume in the 100 Å to 400 Å pore diameter range of at least about 0.005 cc/g, specifically at least about 0.08 cc/g, more specifically at least about 0.15 cc/g and an average pore diameter of from about 15 Å to about 100 Å, specifically from about 20 Å to about 90 Å, and more specifically from about 40 Å to about 64 Å. Advantageously, the activated carbon possesses the additional properties set forth in Table

1.

TABLE 1

|  | Broad Range Minimum | Preferred Range Minimum |
|---|---|---|
| Crush Strength, lbs | 8.0 | 11.0 |
| Surface area, m²/g | 100 | 200–800 |
| Real density, g/cc | 1.9–2.2 | 1.9–2.2 |
| Particle density, g/cc | 0.6–1.0 | 0.6–1.0 |
| Mesh Size | 2–100 | 4–20 |
| Alpha Value | 2.9–7 | 3.0–6 |
| Pore area in the 100 Å to 400 Å pore diameter range m²/g | Minimum 1 | Minimum 50 |

Average pore diameter and other properties are determined by the following methods.

Real density was determined by gas pychnometry using a Micromeritics Autopychnometer 1320.

The particle density of a catalyst or similar porous material can be determined by measuring the amount of mercury necessary to fill a container of known volume after a sample of known weight has been introduced. Mercury does not "wet" most porous solids and, as a result, will not enter its pores. In this method, mercury is allowed to flow into the sample tube under atmospheric pressure (14.7 psia). At this pressure only pores with a diameter, d, greater than about 150,000 Å, or 15 microns, will be filled. This estimate of minimum pore diameter is based on the following equation:

$$d = (4 \gamma \cos \Theta) + P$$

where $\gamma$ is the surface tension of mercury, $\Theta$ is the wetting or contact angle of mercury, and P is the pressure applied to mercury for pore penetration. This equation reduces to:

$$d = 215.1[+P = 215.1 + 14.7 \approx 15 \text{ microns}$$

wherein d and P are expressed in units of microns and psia, respectively.

The pore volume is determined as follows:

$$\text{Pore Volume, cc/g} = \frac{1}{(D_p)} - \frac{1}{(D_r)}$$

wherein
$D_p$ = particulate density, g/cc
$D_r$ = real density, g/cc

Calculation of the average pore diameter is determined as follows:

$$\text{Average Pore Diameter,} = \frac{PV \times 4 \times 10^4}{SA}$$

where
PV = pore volume, cc/g
SA = surface area, m²/g

The surface area, expressed as m²/g, was determined by the amount of a monomolecular layer of $N_2$ adsorbed onto a sample between ice and liquid $N_2$ temperature. A Micromeritics 2200 Surface Area Analyzer was used for this measurement.

A Micromeritics Digisorb 2600 instrument was used to determine pore diameter distribution. The adsorption and desorption isotherms for nitrogen at different pressures were plotted and pore size and pore area distribution was calculated.

The activated carbon useful in the present invention is preferably prepared from lignite coal. Coals, such as anthracite, bituminous coal, and lignite are classified according to moist, mineral-matter-free energy content in accordance with the measuring requirements set by ASTM Standard D-388. In this method of classification, lignite has a moist energy of less than 8,300 BTU/lb. Lignite based activated carbons suitable for use in the method of the present invention include those available from the American Norit Company, Inc., of Jacksonville, Fla., such as Darco® brand carbon and Petrodarco A™ carbon. Another lignite based activated carbon useful in the method of this invention is one produced by Alfa Products, Danvers, Mass., Alfa™ brand carbon.

Non-lignite based activated carbons may also be used in the method of the present invention. For example, a peat based activated carbon designated as Norit®ROX 0.8 carbon is available from the American Norit Company and is suitable for use in the hydrotreating process of the present invention.

The pore volume distribution is an important factor to consider with respect to activated carbons. It has been found that the pore volume distribution in the 79 Å to 500 Å pore diameter range is particularly important with respect to treating processes for heavy oil to facilitate the catalytic reaction of large oil molecules. Heavy oils contain molecules with diameters greater than about 50 Å, a significant percentage of which have diameters in the 200 Å to 400 Å range. Large pores in the catalyst can accommodate the molecules of this size range thereby facilitating demetallation, desulfurization, catalytic cracking and hydrogenation at the pore sites.

One surprising result is the effectiveness of a relatively small average pore diameter. Compared with cobalt-molybdenum on alumina (CoMo/Al$_2$O$_3$), which has an average pore diameter of over 70 Å, Darco® carbon has an average pore size of about 54 Å.

Table 2 sets forth the pore distribution comparison of Darco® carbon, Alfa™ carbon, alumina, Petrodarco A™ carbon, and Norit® ROX 0.8 carbon. Both the incremental pore volumes and incremental pore areas are compared. Table 4 sets forth the pore volumes and pore areas in the 100 Å to 400 Å pore diameter range. As can be seen, Darco® carbon has significant catalyst surface area in the 100 Å to 400 Å range. For example, comparing pore area in the 100 Å to 400 Å pore diameter range (see Table 4), Darco® carbon has a pore area of 52,103 m²/g whereas Alfa™ carbon has 1,226 m²/g in the same range and alumina has a pore area of 6.165 m²/g in the same pore diameter range. With respect to pore volume, Darco® carbon has a pore volume of 0.205864 cc/g in the 100 Å to 400 Å pore diameter range, whereas Alfa™ carbon has a pore volume of 0.005136 cc/g in that pore diameter range, and alumina has a pore volume of 0.02422 cc/g in the 100 Å to 400 Å pore diameter range.

While the addition of metals such as cobalt and molybdenum to activated carbons does change the pore distribution, these changes are not critical to the use of the materials in this invention. As shown in Table 3, CoMo impregnated Darco® carbon has a pore area of 41,823 m²/g and a pore volume of 0.16630 cc/g in the 100 Å to 400 Å pore diameter range, while Alfa™ carbon has a pore area of 1,235 m²/g and a pore volume of 0.005371 cc/g in the same 100 Å to 400 Å pore diameter range.

TABLE 2

DESORPTION PORE DISTRIBUTION
Compared with Incremental Pore Volume and Pore Area

| Pore Diameter Range, Å | Average Diameter, Å | Incremental Pore Volume (cc/g) | | | | |
|---|---|---|---|---|---|---|
| | | Darco ® C | Alfa ™ C | Alumina | Petrodarco A ™ C | Norit ® ROX 0.8 C |
| 600–400 | 500 | 0.013834 | 0.000881 | 0.002497 | 0.012523 | 0.022464 |
| 400–200 | 300 | 0.064484 | 0.002089 | 0.005023 | 0.079431 | 0.045689 |
| 200–150 | 175 | 0.057187 | 0.001069 | 0.003172 | 0.051155 | 0.017227 |
| 150–100 | 125 | 0.084193 | 0.001978 | 0.016025 | 0.074010 | 0.023003 |
| 100–50 | 75 | 0.160760 | 0.005918 | 0.336205 | 0.124958 | 0.037725 |
| 50–30 | 40 | 0.190746 | 0.022680 | 0.038918 | 0.141874 | 0.105704 |
| 30–15 | 22.5 | 0.100566 | 0.180786 | 0.005537 | 0.074099 | 0.124613 |
| Cumulative Pore Volume, (cc/g): | | 0.671769 | 0.215345 | 0.407376 | 0.558050 | 0.376425 |
| 600–400 | 500 | 1.162 | 0.071 | 0.214 | 1.544 | 1.888 |
| 400–200 | 300 | 10.105 | 0.305 | 0.750 | 12.210 | 6.881 |
| 200–150 | 175 | 13.472 | 0.253 | 0.761 | 12.090 | 4.056 |
| 150–100 | 125 | 28.526 | 0.668 | 4.654 | 24.818 | 7.712 |
| 100–50 | 75 | 94.409 | 3.049 | 204.270 | 72.949 | 22.023 |
| 50–30 | 40 | 197.159 | 25.015 | 38.087 | 146.081 | 111.403 |
| 30–15 | 22.5 | 200.417 | 404.435 | 9.058 | 148.220 | 262.675 |
| Cumulative Pore Volume, (sq. m/g): | | 545.250 | 433.797 | 257.795 | 417.912 | 416.638 |

TABLE 3

DESORPTION PORE DISTRIBUTION
CoMo on Activated Carbon

| Pore Diameter Range Å | Average Diameter Å | Incremental Pore Volume (cc/g) | Cumulative Pore Volume (cc/g) | Incremental Pore Area m²/g | Cumulative Pore Area m²/g |
|---|---|---|---|---|---|
| CoMo/Darco ® carbon | | | | | |
| 600–400 | 500 | 0.011864 | 0.011864 | 0.996 | 0.996 |
| 400–200 | 300 | 0.054064 | 0.065928 | 8.584 | 9.580 |
| 200–150 | 175 | 0.045044 | 0.110972 | 10.631 | 20.210 |
| 150–100 | 125 | 0.067192 | 0.178163 | 22.608 | 42.818 |
| 100–50 | 75 | 0.124167 | 0.302330 | 72.910 | 115.728 |
| 50–30 | 40 | 0.144508 | 0.446839 | 148.471 | 264.199 |
| 30–15 | 22.5 | 0.056684 | 0.503528 | 111.886 | 376.084 |
| CoMo/Alfa ™ carbon | | | | | |
| 600–400 | 500 | 0.001542 | 0.001542 | 0.141 | 0.141 |
| 400–200 | 300 | 0.002465 | 0.004007 | 0.373 | 0.513 |
| 200–150 | 175 | 0.001198 | 0.005205 | 0.277 | 0.790 |
| 150–100 | 125 | 0.001708 | 0.006913 | 0.585 | 1.376 |
| 100–50 | 75 | 0.005562 | 0.012475 | 3.097 | 4.473 |
| 50–30 | 40 | 0.019280 | 0.031855 | 21.073 | 25.546 |
| 30–15 | 22.5 | 0.157588 | 0.189443 | 353.340 | 388.886 |

TABLE 4

Pore Volumes and Pore Areas in the
100 Å to 400 Å Pore Diameter Range

| | Pore Volume (cc/g) | Pore Area m²/g |
|---|---|---|
| Darco ® C | 0.205864 | 52.103 |
| Petrodarco A ™ C | 0.204596 | 49.118 |
| Norit ® ROX 0.8 C | 0.085919 | 18.649 |
| Alfa ™ C | 0.005136 | 1.226 |
| Alumina | 0.02422 | 6.165 |

The spent catalyst is typically steam stripped to remove at least some of the hydrocarbons adsorbed on it, then the spent catalyst is partially gasified.

Catalyst Gasification

The spent catalyst is partially gasified by introducing steam and/or a source of oxygen into a bed of catalyst particles at an appropriate temperature, thereby producing a synthesis gas comprising carbon monoxide and hydrogen and producing a catalyst residue that contains carbon and most of the metal from the spent catalyst. The gasification can be accomplished using any suitable process method. Typical gasification processes include, for example, the Winkler, the Koppers-Totzek, and the Lurgi processes. The catalyst particles may be partially gasified in a fixed bed, a moving fixed bed, an entrained bed, or a fluidized bed as desired. The gasification temperature may be about 300° to about 2,000° C. and the pressure may be about atmospheric up to about 2,000 psig. By partial gasification is meant gasification of about 1 to about 99 wt. % of the carbon content of the spent catalyst, specifically gasification of about 10 to about 80 wt. % of the carbon content of the spent catalyst.

An example of a suitable gasifier is one where the catalyst particles are charged into a heated, pressurized, fluidizing vessel wherein the catalyst particles are heated to at least about 900° C. At this elevated temperature, a carefully controlled stream of oxygen sufficient to maintain the bed temperature is introduced along with steam. The amount of steam introduced is sufficient to cause the bed of catalyst particles to become fluidized. In addition, the amount of oxygen and steam introduced is sufficient to generate gaseous products according to reaction (1) with a minimum product formed by reaction (2) as shown below and as is well known in the art.

$$C + H_2O \rightarrow CO + H_2 \quad (1)$$

$$C + 2 H_2O \rightarrow CO_2 + H_2O \quad (2)$$

Although reaction (2) is not favored according to the method of the present invention, some partial contribution to the gasification effluent from reaction (2) is acceptable.

The carbon monoxide and hydrogen gases which are generated leave the pressurized vessel and may be used for hydrocarbon synthesis, hydrogenation of aromatic containing feeds (using CO and $H_2O$), to drive at least one turbine for the purpose of electric power generation, or may be introduced along with additional spent catalyst into a second pressurized vessel for steam generation in which the primary fuel source is the spent catalyst in the form of a fluidized bed. In the steam generator, the desired chemical reactions which take place are as follows:

$$2 H_2 + O_2 \rightarrow 2 H_2O + \text{heat} \quad (3)$$

$$2 CO + O_2 \rightarrow 2 CO_2 + \text{heat} \quad (4)$$

$$H_2O + C \rightarrow CO + H_2 \quad (5)$$

In accordance with reactions (3), (4), and (5), as the carbon monoxide and hydrogen gasification effluent from the first reaction vessel enters the steam generator, a source of oxygen, such as air, is introduced into the steam generator to supply the necessary oxygen for the combustion of the gasification effluent and the generation of the necessary heat for heating the fresh bed of catalyst through reactions (3) and (4). The exothermic reactions yield water and carbon dioxide as the combustion products. Since the bed of catalyst is maintained at an elevated temperature due to the heat generated, the water generated in reaction (3) immediately reacts with the catalyst to regenerate carbon monoxide and hydrogen via reaction (5), thus partially consuming the catalyst. The carbon monoxide and hydrogen gases which are generated may be further combusted to generate more heat for steam generation. If the amount of water generated by reaction (3) is not sufficient to allow the forward progress of reaction (5), additional steam may be added to the reaction zone.

Inasmuch as the whole system is pressurized, the gaseous effluent which leaves the steam generator may be used to drive at least one turbine for the purpose of electric power generation. Additionally, the effluent may be processed to derive methanol or other hydrocarbons by conventional methods.

Hydrogen produced during the steam gasification of carbon catalysts according to this invention may also be separated from the CO and may be used elsewhere in the refinery, such as for other hydrotreating applications.

Hydrocarbon Synthesis

As mentioned above, a number of hydrocarbon synthesis processes are known in the art. For example, the Fischer-Tropsch process, which involves the catalytic hydrogenation of carbon monoxide using hydrogen, may be used to produce a variety of hydrocarbons ranging from methane to waxes. Examples of hydrocarbon synthesis products that may be made using the synthesis gas of this invention include ammonia, acetic acid, methane, methanol, urea and other hydrocarbons, such as naphtha, olefins, gasoline, diesel fuel, paraffins, waxes, ketones, aromatics, and alcohols.

Since the spent catalyst of this invention typically contains sulfur, some form of sulfur recovery will typically be required as a part of the hydrocarbon synthesis process. Conventional sulfur recovery processes include sulfuric acid production processes and the Claus process for elemental sulfur production.

Alloy and Steel Production

As mentioned earlier, alloy and steel production methods are known in the art. According to this invention, the catalyst residue produced by partial gasification is used in the manufacture of alloys and specialty steel to provide components that add valuable properties to the alloys and steel. For example, vanadium, molybdenum and cobalt are known to produce carbides in steel that are useful to increase the hardness and wear resistance of the steel. Steels and alloys produced with these metals are useful as tool steels, as additives to other materials such as aluminum to improve wear resistance, and as superalloys that have good high temperature properties.

An advantage associated with the use of the catalyst residue produced according to this invention is that the material may be added to the molten bath used to produce the steel or alloy. If desired, one or more metals from the catalyst residue may also be extracted from the residue and then subsequently incorporated into the steel or alloy. Naturally, any metals or other additives needed for alloy steel production not present in the desired quantities in the catalyst residue may also be used to supplement those contained in the catalyst residue. For the purposes of this invention, the catalyst residue should generally contain greater than about 10 ppm, specifically greater than about 100 ppm, more specifically greater than about 1,000 ppm, most specifically greater than about 10,000 ppm of at least one metal useful in alloy or steel production.

The following examples illustrate hydrotreating catalysts of the present invention as exemplified by Alfa™ carbon, Darco® carbon, Norit® ROX 0.8 carbon, and Petrodarco A™ carbon, both neat and in some instances having been impregnated with Co and Mo, with respect to the demetallation of two atmospheric residue feedstocks. Use of activated carbon in this process is advantageous because it is less expensive than other commercially available hydrotreating catalysts, and because the spent catalyst can be partially gasified and then the residue of the partially gasified catalyst can be recovered and used for steel production. Since spent catalysts are usually disposed of in landfills, the environmental impact as well as the disposal costs associated with the spent catalysts can be reduced by about 50% to about 75% through the use of this invention.

The use of spent metals-containing carbon catalysts for steel or alloy manufacturing according to the method of this invention, not only reduces the need for expensive catalyst disposal, but also eliminates any potential pollution of the environment by improper catalyst landfilling or disposal.

EXAMPLES

Examples will be provided for two types of hydroprocessing catalysts: 1) neat activated carbons, such as American Norit Co. produced activated carbon, e.g. Petrodarco A™, Norit® ROX 0.8, and Darco® carbons, and Alpha Products Alfa™ carbon; and 2) some of these carbons impregnated with Co and Mo.

Some of the neat activated carbon catalysts of this invention were tested to determine the alpha value ($\alpha$) of the catalysts. When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an alpha of 1 (rate constant is 0.016 $sec^{-1}$). The alpha test is described in U.S. Pat. No. 3,354,078; in the *Journal of Catalysis*, Vol. 4, p 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395. The higher alpha values correspond to a more active catalyst.

EXAMPLE 1

A CoMo impregnated activated carbon, where the activated carbon was impregnated with the cobalt and the molybdenum at the same time, was prepared as follows: 11.84 g of cobaltous nitrate, $Co(NO_3)_2 \cdot 6\ H_2O$, and 15.45 g of ammonium paramolybdate, $(NH_4)_6Mo_7O_{24} \cdot 4\ H_2O$, were dissolved in 40 ml $H_2O$ and were added to 89.2 g carbon pellets (6–8 mesh activated carbon, Alfa™ C, Alfa Products, Danvers, Mass.). The impregnated carbon was calcined at 150° C. for 3 hours and 500° C. for 10 hours in $N_2$. Physical properties of this catalyst and the unimpregnated base Alfa™ C are given in Table 5. The unimpregnated base Alfa™ C is called catalyst A and the CoMo impregnated Alfa™ C is called catalyst B.

TABLE 5

| Catalyst Properties | | |
| --- | --- | --- |
|  | Alfa ™ C | CoMo Alfa ™ C |
| Catalyst | A | B |
| Co, wt. % | — | 2.02 |
| Mo, wt. % | — | 7.71 |
| Surface Area, m²/g | 946 | 726 |
| Real Density, g/cc | 2.072 | — |
| Particle Density, g/cc | 1.023 | — |
| Volume | 0.495 | — |
| Average Pore Diameter, Å | 20 | — |
| Alpha Value | ~4.8 | — |
| C, wt. % | 90.42 | 71.92 |
| H, wt. % | <0.5 | 0.82 |
| N, wt. % | 0.93 | — |
| S, wt. % | 0.87 | — |
| Ash, wt. % | 3.39 | 16.62 |
| Fe, wt. % | 0.33 | — |
| $Al_2O_3$, wt. % | 1.05 | — |
| $SiO_2$, wt. % | 1.29 | — |
| Cu, PPM | 0.047 | — |
| K, wt. % | 0.024 | — |
| V, ppm | 54 | — |
| Ni, ppm | 29 | — |

TABLE 5-continued

| Catalyst Properties | | |
| --- | --- | --- |
|  | Alfa ™ C | CoMo Alfa ™ C |
| Cr, ppm | 66 | — |
| Cl, ppm | <13 | — |
| Na, ppm | 612 | — |
| Ca, wt. % | 0.037 | — |
| Li, ppm | <50 | — |
| Mg, wt. % | 0.013 | — |

EXAMPLE 2

The base Alfa™ activated carbon and the CoMo impregnated Alfa™ activated carbon were used for hydroprocessing Maya 650° F.⁺ atmospheric resid. Properties of the 650° F.⁺ resid are presented in Table 6. The 6–8 mesh activated carbon pellets from Alfa had a crush strength of 141 lbs. The experiments were conducted in a trickle bed micro unit of standard design, which was packed with a mixture of 11.23 g of the catalyst to be tested and 30 cc sand. All runs were performed at 750° F. and 1,500 psig $H_2$ partial pressure, with the feed rate at 5.8 cc/hr (5.6 g/hr), and a weight hourly space velocity (WHSV) of 0.5 $hr^{-1}$. The liquid hourly space velocity (LHSV) for both the base activated carbon and the CoMo impregnated carbon catalysts was 0.25 $hr^{-1}$. The hydrogen flow rate was 95 cc/min and corresponded to 5,800 SCF/bbl. Material balances were greater than 98%. Standard presulfiding procedures with 2% $H_2S$ in $H_2$ were used.

The micro unit incorporated a bottoms receiver held at 200° C. to drive off volatiles. A 2° C. liquid cooled trap condensed low boiling components. A gas sampling system equipped with bombs was used to obtain gas samples for analyses. A wet test meter measured cumulative off gas volumes.

Simulated distillations with chromasorb of the bottom fractions were conducted to determine the percentage of the 1,000° F. material in the liquid product. Bottoms liquid product that boiled above 200° C. represented 90–95% of the total liquid product. The product liquid was analyzed for Conradson Carbon Residue (CCR) and an elemental analysis was done. The catalyst in the reactor was washed with tetrahydrofuran (THF), dried, and separated into thirds (top, middle, and bottom fractions) for further analyses. Tables 7 and 8 illustrate the hydroprocessing results. Table 9 illustrates the results of the analyses of the base activated carbon and the CoMo impregnated activated carbon catalysts after use in this study. These catalysts contain Ni and V deposited on the catalyst during the study.

TABLE 6

| Maya 650° F.⁺ Atmospheric Resid Properties | |
| --- | --- |
| C, wt. % | 83.00 |
| H, wt. % | 10.41 |
| O, wt. % | 0.78 |
| N, wt. % | 0.48 |
| S, wt. % | 4.92 |
| Ni, ppm | 83 |
| V, ppm | 417 |
| CCR, wt. % | 17.59 |
| Boiling Ranges, °F. | wt. % |
| 420–650 | 1.20 |
| 650–850 | 23.23 |
| 850–1,000 | 17.33 |

TABLE 6-continued

| | |
|---|---|
| 1,000° F.+ | 58.24 | nC$_5$ soluble asphaltenes, wt. % 29.45

TABLE 7

Catalyst A
Unimpregnated Alfa ™ C Hydroprocessed
Maya 650° F.+ Resid

| | Days on Stream | | | | | |
|---|---|---|---|---|---|---|
| | 1.7 | 3.0 | 5.1 | 6.8 | 8.7 | 10.7 |
| Liquid Properties | | | | | | |
| C, wt. % | 85.35 | 83.97 | 84.76 | 85.08 | 84.66 | 84.93 |
| H, wt. % | 10.85 | 10.88 | 10.62 | 10.41 | 10.76 | 10.88 |
| N, wt. % | 0.09 | 0.37 | 0.53 | 0.42 | 0.47 | 0.15 |
| O, wt. % | 0.67 | 1.18 | 0.50 | 0.49 | 0.52 | 0.48 |
| S, wt. % | 3.72 | 3.59 | 3.59 | 3.60 | 3.59 | 3.56 |
| CCR, wt. % | 13.76 | — | — | 13.89 | — | — |
| Ni, ppm | 54 | 52.66 | 57.51 | 52.31 | 53.54 | 55.68 |
| V, ppm | 238 | 215.52 | 228.07 | 228.62 | 216.10 | 210.99 |
| Demetallation, % | 41.6 | 46.4 | 42.9 | 43.8 | 46.1 | 46.7 |
| Ni removal, % | 34.9 | 36.6 | 30.7 | 37.0 | 35.5 | 32.9 |
| V removal, % | 42.9 | 48.3 | 45.3 | 45.1 | 48.2 | 49.4 |

TABLE 8

Catalyst B -- CoMo/Alfa ™ C Hydroprocessed Maya 650° F.+ Resid

| | Days on Stream | | | | | | | | |
|---|---|---|---|---|---|---|---|---|---|
| | 0.1 | 0.7 | 1.7 | 3.2 | 4.1 | 5.1 | 6.2 | 8.2 | 10.1 |
| Liquid Properties | | | | | | | | | |
| C, wt. % | 85.73 | 85.88 | 85.63 | 85.57 | 85.92 | 85.74 | 85.54 | 85.65 | 85.73 |
| H, wt. % | 11.50 | 11.36 | 11.19 | 11.26 | 11.25 | 11.18 | 11.16 | 11.13 | 10.87 |
| N, wt. % | 0.37 | 0.31 | 0.38 | 0.30 | 0.01 | 0.25 | 0.35 | 0.24 | 0.44 |
| O, wt. % | 0.51 | 0.53 | 0.61 | 0.63 | 0.61 | 0.56 | 0.55 | 0.66 | 0.49 |
| S, wt. % | 1.89 | 1.92 | 2.19 | 2.24 | 2.21 | 2.27 | 2.40 | 2.32 | 2.47 |
| CCR, wt. % | — | — | 11.94 | — | — | — | — | 12.50 | — |
| Ni, ppm | 54.28 | 47.77 | 49.63 | 47.72 | 45.27 | 47.67 | 51.59 | 46.48 | 45.20 |
| V, ppm | 213.43 | 174.54 | 189.14 | 182.47 | 178.24 | 176.65 | 178.80 | 173.60 | 183.00 |
| Demetallation, % | 46.5 | 55.5 | 55.2 | 54.0 | 55.3 | 55.1 | 53.9 | 56.0 | 54.4 |
| Ni removal, % | 34.6 | 42.4 | 40.2 | 42.5 | 45.5 | 42.6 | 37.8 | 44.0 | 45.5 |
| V removal, % | 48.8 | 58.1 | 54.6 | 56.2 | 57.3 | — | — | — | — |

TABLE 9

Activated Carbon Catalyst Analyses
After Hydroprocessing Maya 650° F. Resid for 8 Days

| | Catalyst A Unimpregnated Alfa ™ C | | | Catalyst B CoMo/Alfa ™ C | | |
|---|---|---|---|---|---|---|
| | Top | Middle | Bottom | Top | Middle | Bottom |
| C, wt. % | 87.36 | 87.87 | 89.49 | 73.29 | 80.33 | 79.52 |
| H, wt. % | 3.06 | 3.07 | 3.07 | 2.48 | 2.68 | 2.61 |
| N, wt. % | 1.08 | 0.99 | 1.04 | 0.81 | 1.12 | 1.04 |
| S, wt. % | 4.15 | 3.69 | 3.52 | 6.60 | 11.19 | 4.58 |
| Ni, wt. % | 0.29 | 0.65 | 0.21 | 0.49 | 0.26 | 0.19 |
| V, wt. % | 2.11 | 1.75 | 1.27 | 3.29 | 1.52 | 0.90 |
| Co, wt. % | — | — | — | 1.10 | 1.06 | 1.17 |
| Mo, wt. % | — | — | — | 4.03 | 3.76 | 4.38 |

EXAMPLE 3

A CoMO impregnated activated carbon, where the activated carbon was impregnated with the molybdenum first and then the cobalt, was prepared as follows: 7.73 g of ammonium paramolybdate, $(NH_4)_6Mo_7O_{24} \cdot 4 H_2O$, were dissolved in 20 ml $H_2O$ and were added to 44.6 g carbon pellets (6-8 mesh Alfa™ C). The Mo impregnated catalyst was dried in a vacuum oven at 100° C. for about 5 hours. Then 11.84 g of cobaltous nitrate, $Co(NO_3)_2 \cdot 6 H_2O$, were dissolved in 30 cc $H_2O$ and were added to the dried catalyst prepared above. The impregnated carbon was dried overnight at 100° C. and then vacuum dried at 100° C. for 5 hours. The surface area of this catalyst was 726 m$^2$/g. This catalyst is called catalyst C.

EXAMPLE 4

A CoMo impregnated activated carbon, where the activated carbon was first impregnated with the molybdenum and then with the cobalt, was prepared as follows: 7.73 g of ammonium paramolybdate, $(NH_4)_6Mo_7O_{24} \cdot 4 H_2O$, were dissolved in 50 ml $H_2O$ and were added to 44.6 g activated carbon (12/20 mesh activated carbon, Darco® C, American Norit Company, Inc., Jacksonville, Fla.). Then 5.92 g of cobaltous nitrate, $Co(NO_3)_2 \cdot 6 H_2O$, were dissolved in 55 ml $H_2O$ and were added to the Mo impregnated activated carbon. The CoMo impregnated carbon was dried overnight at 100° C. and then dried in a vacuum oven at 100° C. for 5 hours. Physical properties of this catalyst and the unimpregnated base Darco® C are given in Table 10. The unimpregnated Darco® C catalyst is called catalyst D and the CoMo impregnated Darco® C catalyst is called catalyst E.

TABLE 10

| Catalyst Properties | | |
|---|---|---|
| | Darco ® C | CoMo Darco ® C |
| Catalyst | D | E |
| Co, wt. % | — | 3.77 |
| Mo, wt. % | — | 9.26 |
| Surface Area, m$^2$/g | 712 | 459 |
| Real Density, g/cc | 1.990 | — |
| Particle Density, g/cc | 0.676 | — |
| Pore Volume | 0.977 | — |

TABLE 10-continued

Catalyst Properties

|  | Darco ® C | CoMo Darco ® C |
|---|---|---|
| Average Pore Diameter, Å | 54 | — |
| Alpha Value | ~2.9 | — |
| C, wt. % | 81.08 | 61.95 |
| H, wt. % | 1.08 | 1.03 |
| N, wt. % | 7.60 | 1.10 |
| S, wt. % | 0.48 | — |
| Ash, wt. % | 10.04 | 22.13 |
| Fe, wt. % | 0.25 | — |
| $Al_2O_3$, wt. % | 3.45 | — |
| $SiO_2$, wt. % | 9.99 | — |
| Cu, ppm | 40 | — |
| K, wt. % | 0.0025 | — |
| Ni, ppm | 16 | — |
| V, ppm | 37 | — |
| Cr, ppm | 15 | — |
| Cl, ppm | 1,747 | — |
| Na, ppm | 1,103 | — |
| Ca, wt. % | 0.22 | — |
| Li, ppm | <48 | — |
| Mg, wt. | 0.096 | — |

EXAMPLE 5

Catalysts A, B, C, D, and E as prepared above were used for hydroprocessing Arab Heavy 650° F.$^+$ atmospheric resid. Properties of the 650° F.$^+$ resid are presented in Table 11. The experiments were conducted in a trickle bed micro unit of standard design, which was packed with a mixture of 11.23 g of the catalyst to be tested and 30 cc sand. All runs were performed at 750° F. or 775° F., and 1,500 psig $H_2$ partial pressure, with the feed rate at 5.8 cc/hr (5.6 g/hr), and a weight hourly space velocity (WHSV) of 0.5 hr$^{-1}$. Each catalyst run was made for about 7 days at 750° F., then about 7 days at 775° F., and then 2 days at 750° F. The hydrogen flow rate was 95 cc/min and corresponded to 5,800 SCF/bbl. Material balances were greater than 98%. Standard pre-sulfiding procedures with 2% $H_2S$ in $H_2$ were used.

The micro unit incorporated a bottoms receiver held at 200° C. to drive off volatiles. A 2° C. liquid cooled trap condensed low boiling components. A gas sampling system equipped with bombs was used to obtain gas samples for analyses. A wet test meter measured cumulative off gas volumes.

Simulated distillations with chromasorb of the bottom fractions were conducted to determine the percentage of the 1,000° F. material in the liquid product. Bottoms liquid product that boiled above 200° C. represented 90–95% of the total liquid product. The product liquid was analyzed for Conradson Carbon Residue (CCR) and an elemental analysis was done. Tables 12, 13, and 14 illustrate the hydroprocessing results.

TABLE 11

Arab Heavy 650° F.$^+$ Atmospheric Resid Properties

| C, wt. % | 84.07 |
|---|---|
| H, wt. % | 10.65 |
| O, wt. % | 0.81 |
| N, wt. % | 0.30 |
| S, wt. % | 4.23 |
| Ni, ppm | 32 |
| V, ppm | 104 |
| CCR, wt. % | 12.03 |
| Boiling Ranges, °F. | wt. % |
| 420–650 | 2.50 |
| 650–850 | 29.25 |
| 850–1,000 | 19.54 |
| 1,000° F.$^+$ | 48.71 |

TABLE 12

Summary of Hydroprocessing Arab Heavy 650° F.$^+$ Resid
Catalyst A -- Unimpregnated Alfa ™ C

| Days on Stream | 1.9 | 6.9 | 8.9 | 12.7 | 13.8 |
|---|---|---|---|---|---|
| Reactor Temperature, °F. | 750 | 750 | 775 | 775 | 750 |
| % Conversion to 1,000° F.$^-$ | 17.80 | 17.29 | 30.15 | 24.12 | 15.78 |
| % Removal |  |  |  |  |  |
| Sulfur | 19.1 | 13.9 | 25.8 | 19.1 | 16.8 |
| Conradson Carbon | 20.2 | 17.1 | 29.8 | 20.7 | 13.5 |
| Total metals | 30.2 | 32.8 | 48.0 | 41.2 | 35.4 |
| Nickel | 22.1 | 33.8 | 38.9 | 31.6 | 30.6 |
| Vanadium | 32.7 | 32.4 | 50.8 | 44.2 | 36.8 |

TABLE 13

Summary of Hydroprocessing Arab Heavy 650° F.$^+$ Resid

Catalyst B -- CoMo Impregnated Alfa ™ C

| Days on Stream | 1.9 | 6.8 | 8.9 | 14.9 | 16.9 |
|---|---|---|---|---|---|
| Reactor Temperature, °F. | 750 | 750 | 775 | 775 | 750 |
| % Conversion to 1,000° F.$^-$ | 24.94 | 24.38 | 37.65 | 36.13 | 17.91 |
| % Removal |  |  |  |  |  |
| Sulfur | 55.8 | 50.8 | 59.3 | 57.4 | 44.7 |
| Conradson Carbon | 32.0 | 29.8 | 37.4 | 37.7 | 24.4 |
| Total metals | 41.2 | 41.8 | 53.9 | 53.0 | 38.5 |
| Nickel | 31.9 | 25.5 | 45.3 | 47.9 | 33.9 |
| Vanadium | 45.3 | 46.8 | 56.6 | 54.6 | 39.9 |

Catalyst C -- CoMo Impregnated Alfa ™ C

| Days on Stream | 2.3 | 6.7 | 8.7 | 14.7 | 16.8 |
|---|---|---|---|---|---|
| Reactor Temperature, °F. | 750 | 750 | 775 | 775 | 750 |
| % Conversion to 1,000° F.$^-$ | 37.77 | 38.54 | 57.66 | 53.57 | 30.83 |
| % Removal |  |  |  |  |  |
| Sulfur | 66.9 | 62.6 | 72.6 | 68.0 | 55.1 |
| Conradson Carbon | 36.8 | 34.4 | 44.2 | 42.3 | 31.5 |
| Total metals | 47.8 | 48.2 | 58.1 | 57.8 | 44.3 |
| Nickel | 32.9 | 26.7 | 35.0 | 48.8 | 37.8 |
| Vanadium | 52.4 | 54.8 | 65.2 | 60.0 | 46.3 |

TABLE 14

Summary of Hydroprocessing Arab Heavy 650° F.$^+$ Resid

Catalyst D -- Unimpregnated Darco ® C

| Days on Stream | 1.6 | 6.8 | 8.8 | 14.8 | 16.9 |
|---|---|---|---|---|---|
| Reactor Temperature, °F. | 750 | 750 | 775 | 775 | 750 |
| % Conversion to 1,000° F.$^-$ | 18.86 | 20.94 | 34.25 | 35.01 | 17.19 |
| % Removal |  |  |  |  |  |
| Sulfur | 10.4 | 11.8 | 21.7 | 19.6 | 9.5 |
| Conradson Carbon | 13.5 | -- | 22.5 | 21.9 | 16.0 |
| Total metals | 24.7 | 23.0 | 57.4 | 59.6 | 40.4 |
| Nickel | 25.3 | 14.6 | 48.1 | 40.5 | 27.6 |
| Vanadium | 24.6 | 45.6 | 71.2 | 67.8 | 47.1 |

Catalyst E -- CoMo Impregnated Darco ® C

| Days on Stream | 1.8 | 6.8 | 8.8 | 14.8 | 16.8 |
|---|---|---|---|---|---|
| Reactor Temperature, °F. | 750 | 750 | 775 | 775 | 750 |
| % Conversion to 1,000° F.$^-$ | 34.04 | 35.47 | 52.19 | 47.89 | 29.67 |
| % Removal |  |  |  |  |  |
| Sulfur | 66.7 | 57.7 | 64.3 | 60.3 | 46.6 |

TABLE 14-continued

Summary of Hydroprocessing Arab Heavy 650° F.+ Resid

| Conradson Carbon | 37.6 | 33.3 | 43.2 | 39.1 | 25.1 |
|---|---|---|---|---|---|
| Total metals | 83.2 | 79.8 | 86.6 | 86.7 | 71.5 |
| Nickel | 69.1 | 70.3 | 68.7 | 72.1 | 58.7 |
| Vanadium | 87.5 | 82.7 | 92.1 | 91.2 | 75.5 |

EXAMPLE 6

Two neat activated carbons, Petrodarco A™ and Norit® ROX 0.8 (both from American Norit Company, Inc., Jacksonville, Fla.), were used as received after drying for 5 hours in a vacuum oven. These catalysts are called Catalysts F and G respectively and were used to hydroprocess Arab Heavy 650° F.+ resid. Properties of the 650° F.+ resid have been presented in Table 11. The experiments were conducted in a trickle bed micro unit of standard design, which was packed with a mixture of 11.23 g of the catalyst to be tested and 30 cc sand. All runs were performed at temperatures between 750° F. and 799° F. and 1,500 psig $H_2$ partial pressure, with the feed rate at a rate to produce a weight hourly space velocity (WHSV) of 0.5 to 2.0 $hr^{-1}$. The hydrogen flow rate was 95 cc/min and corresponded to 5,800 SCF/bbl. Material balances were greater than 98%. Standard presulfiding procedures with 2% $H_2S$ in $H_2$ were used.

The micro unit incorporated a bottoms receiver held at 200° C. to drive off volatiles. A 2° C. liquid cooled trap condensed low boiling components. A gas sampling system equipped with bombs was used to obtain gas samples for analyses. A wet test meter measured cumulative off gas volumes.

Simulated distillations with chromasorb of the bottom fractions were conducted to determine the percentage of the 1,000° F.− material in the liquid product. Bottoms liquid product that boiled above 200° C. represented 90–95% of the total liquid product. The product liquid was analyzed for Conradson Carbon Residue (CCR) and an elemental analysis was done. Table 15 illustrates the catalyst properties and Table 16 illustrates the hydroprocessing results.

TABLE 15

Catalyst Properties

|  | Petrodarco A ™ | Norit ® ROX 0.8 |
|---|---|---|
| Catalyst | F | G |
| Surface Area, m²/g | 539 | 862 |
| Real Density, g/cc | 2.108 | 2.123 |
| Particle Density, g/cc | 0.741 | 0.671 |
| Pore Volume | 0.875 | 1.019 |
| Average Pore Diameter, Å | 64 | 47 |
| Alpha value | ~6.0 | ~5.5 |
| C, wt. % | 77.3 | 91.8 |
| H, wt. % | 0.5 | 0.5 |
| N, wt. % | <0.5 | 0.6 |
| S, wt. % | 1.1 | 0.8 |
| Ash, wt. % | 28.8 | 2.0 |
| Fe, ppm | 18,000 | 202 |
| $Al_2O_3$, ppm | 42,000 | 737 |
| SiO, wt. % | 8.9 | 1.6 |
| Cu, ppm | 69 | <9 |
| K, wt. % | 0.086 | 0.0079 |
| Ni, ppm | 74 | 50 |
| V, ppm | <12 | <9 |
| Na, ppm | 2,600 | 197 |
| Ca, wt. % | 4.4 | 0.019 |
| Li, ppm | <49 | <47 |
| Mg, wt. % | 0.8 | 0.017 |

TABLE 16

Summary of Hydroprocessing Arab Heavy 650° F.+ Resid

Catalyst F -- Petrodarco A ™

| Days on Stream | 1.8 | 6.9 | 8.7 | 14.8 | 16.7 | 18.0 | 18.8 |
|---|---|---|---|---|---|---|---|
| WHSV, $hr^{-1}$ | 0.5 | 0.5 | 0.5 | 0.5 | 0.5 | 1.0 | 2.0 |
| Reactor Temp., °F. | 750 | 750 | 775 | 775 | 750 | 790 | 799 |
| 1,000° F.− % Conv. | 23.8 | 23.1 | 38.5 | 33.7 | 23.4 | 31.9 | 24.3 |
| % Removal |  |  |  |  |  |  |  |
| Sulfur | 22.2 | 24.1 | 31.9 | 28.1 | 17.5 | 22.9 | 16.1 |
| CCR | 23.1 | 31.2 | 33.5 | 32.7 | 19.9 | 8.0 | 1.8 |
| Total metals | 66.0 | 58.1 | 76.6 | 75.0 | 53.7 | 63.7 | 38.3 |
| Nickel | 51.8 | 36.7 | 53.2 | 52.8 | 30.6 | 40.7 | 18.8 |
| Vanadium | 70.4 | 64.7 | 83.8 | 81.8 | 60.9 | 70.8 | 44.4 |

Catalyst G -- Norit ® ROX 0.8

| Days on Stream | 1.9 | 6.8 | 8.9 | 14.9 | 16.7 | 18.9 | 19.8 |
|---|---|---|---|---|---|---|---|
| WHSV, $hr^{-1}$ | 0.5 | 0.5 | 0.5 | 0.5 | 0.5 | 1.0 | 2.0 |
| Reactor Temp., °F. | 750 | 750 | 775 | 775 | 750 | 790 | 799 |
| 1,000° F.− % Conv. | 19.5 | 20.7 | 35.3 | 32.1 | 13.5 | 27.2 | 20.6 |
| % Removal |  |  |  |  |  |  |  |
| Sulfur | 20.3 | 18.4 | 30.0 | 28.8 | 21.0 | 22.2 | 14.7 |
| CCR | — | 23.6 | 29.8 | 25.3 | 16.1 | 20.4 | 11.4 |
| Total metals | 48.5 | 35.5 | 51.5 | 52.0 | 38.1 | 39.3 | 22.5 |
| Nickel | 49.8 | 25.6 | 36.1 | 44.7 | 30.5 | 31.8 | 20.1 |
| Vanadium | 48.2 | 38.6 | 56.2 | 54.2 | 40.5 | 41.6 | 26.3 |

EXAMPLE 7

A CoMo impregnated Darco® C catalyst prepared in the same fashion as Catalyst E was used to hydroprocess Arab Heavy 650° F.+ resid for 31 days and then was analyzed for metals loadings.

The experiment was conducted in a trickle bed micro unit of standard design, which was packed with a mixture of 11.23 g of the catalyst to be tested and 30 cc sand. The run was performed at a temperature of 775° F. and 1,500 psig $H_2$ partial pressure, with the feed rate at a rate to produce a weight hourly space velocity (WHSV) of 0.5 $hr^{-1}$. The hydrogen flow rate was 95 cc/min and corresponded to 5,800 SCF/bbl. Material balances were greater than 98%. Standard presulfiding procedures with 2% $H_2S$ in $H_2$ were used. The catalyst in the reactor was washed with tetrahydrofuran (THF), dried, and separated into thirds (top, middle, and bottom fractions) for further analyses. This catalyst is called Catalyst H. Results of the analyses of the catalyst are shown in Table 17.

TABLE 17

Activated Carbon Catalyst Analyses
After Hydroprocessing Arab Heavy 650° F.+
Resid for 31 Days

| | Catalyst H CoMo/Darco ® C | | |
|---|---|---|---|
|  | Top | Middle | Bottom |
| C, wt. % | 55.1 | 57.3 | 68.9 |
| H, wt. % | 1.6 | 1.5 | 1.6 |
| N, wt. % | <0.5 | <0.5 | <0.5 |
| S, wt. % | 8.8 | 6.7 | 5.5 |
| Ni, wt. % | 0.9 | 0.4 | 0.2 |
| V, wt. % | 3.5 | 1.3 | 0.5 |
| Co, wt. % | 1.23 | 1.16 | 1.48 |
| Mo, wt. % | 4.44 | 4.98 | 5.10 |

What we claim is:

1. A method comprising:

(a) a process for hydrotreating a hydrocarbon oil feedstock, said process comprising hydrotreating said feedstock in the presence of a catalyst composition, the catalyst composition being selected from the group consisting of neat activated carbon and metal impregnated activated carbon, the metal impregnated activated carbon being one that is impregnated with (a) a molybdenum or tungsten component and (b) a cobalt or nickel component, the activated carbon of the neat activated carbon and the metal impregnated activated carbon consisting essentially of an activated carbon possessing a pore volume in the 100 Å to 400 Å pore diameter range of at least about 0.08 cc/g and an average pore diameter of from about 20 to 64 Å;

(b) recovering the catalyst composition;

(c) partially gasifying the catalyst composition to produce synthesis gas and a catalyst residue;

(d) manufacturing an alloy or steel using said catalyst residue by a method selected from the group consisting of (a) adding the catalyst residue to a molten bath used to produce the steel or alloy and (b) extracting at least one of the metals present on the catalyst residue and then incorporating the extracted metal into the steel or alloy.

2. The method according to claim 1 comprising directing the synthesis gas to a process for recovery of said synthesis gas.

3. The method according to claim 1 comprising directing the synthesis gas to a hydrocarbon synthesis process.

4. The method according to claim 1 wherein the activated carbon of the neat activated carbon or the metal impregnated activated carbon is selected from the group consisting of Alfa™ carbon, Darco® carbon, Norit® ROX 0.8 carbon, Petrodarco A™ carbon and other lignite coal based activated carbons.

5. The method according to claim 1 wherein said synthesis gas comprises at least one of CO or $H_2$.

6. The method according to claim 1 comprising partially gasifying the catalyst composition using steam.

7. The method according to claim 1 comprising partially combusting the catalyst composition under oxygen-deficient conditions to partially gasify the catalyst composition.

8. The method according to claim 1 comprising manufacturing a specialty steel.

9. The method according to claim 1 comprising manufacturing an alloy.

10. The method according to claim 1 comprising manufacturing a superalloy.

11. The method according to claim 1 comprising directing the synthesis gas to a Fischer-Tropsch process.

12. The method according to claim 1 comprising using the synthesis gas to hydroprocess aromatic containing feeds, said synthesis gas comprising CO and $H_2O$.

13. The method according to claim 1 comprising separating $H_2$ from the synthesis gas and directing the separated $H_2$ to other hydrotreating processes.

14. The method according to claim 1 wherein said activated carbon comprises a pore volume in the 100 Å to 400 Å pore diameter range of at least about 0.005 cc/g and an average pore diameter of from about 15 Å to about 100 Å.

15. A method comprising:

(a) steaming a spent catalyst composition that had been used in hydrotreating a hydrocarbon oil by steam stripping the spent catalyst to thereby remove at least a portion of the hydrocarbon adsorbed thereon, said catalyst composition being selected from the group consisting of neat activated carbon or metal impregnated activated carbon, said metal impregnated activated carbon being impregnated with at least one metal selected from the group consisting of cobalt, nickel, tungsten, molybdenum, and mixtures thereof, said neat and metal impregnated activated carbon being selected from the group of activated carbons possessing a pore volume in the 100 Å to 400 Å pore diameter range of at least about 0.08 cc/g and an average pore diameter of from about 20 to 64 Å consisting of Alfa™ carbon, Darco® carbon, Norit® ROX 0.8 carbon, Petrodarco A™ carbon and other lignite coal based activated carbons;

(b) partially gasifying said steam stripped catalyst composition to produce synthesis gas and a catalyst residue;

(c) directing said synthesis gas to a process for recovery of said synthesis gas or use of said synthesis gas for hydrocarbon synthesis;

(d) manufacturing a steel or an alloy using said catalyst residue by a method selected from the group consisting of (a) adding the catalyst residue to a molten bath used to produce the steel or alloy and (b) extracting at least one of the metals present on the catalyst residue and then incorporating the extracted metal into the steel or alloy.

16. A method comprising:

(a) preparing a catalyst composition, said catalyst composition comprising activated carbon having at least one metal deposited thereon, the metal being selected from the group consisting of cobalt, nickel, tungsten, molybdenum, and combinations thereof, the activated carbon consisting essentially of an activated carbon having a pore volume in the 100 Å to 400 Å pore diameter range of at least about 0.08 cc/g and an average pore diameter of from about 20 to about 54 Å;

(b) contacting a heavy oil with said catalyst composition under hydroprocessing conditions;

(c) terminating contact between said heavy oil and said catalyst composition and recovering said catalyst composition;

(d) contacting said recovered catalyst with at least one compound selected from steam, oxygen, or a mixture thereof, under conditions effective to partially gasify said catalyst, thereby producing a synthesis gas and a residue of the catalyst;

(e) directing said synthesis gas into a hydrocarbon synthesis process;

(f) manufacturing a steel or alloy using said catalyst residue by a method selected from the group consisting of (a) adding the catalyst residue to a molten bath used to produce the steel or alloy and (b) extracting at least one of the metals present on the catalyst residue and then incorporating the extracted metal into the steel or alloy.

17. The method according to claim 14 wherein the activated carbon of the neat activated carbon and the metal impregnated activated carbon consists essentially of an activated carbon having a pore volume in the 100 Å to 400 Å pore diameter range of at least about 0.08 cc/g and an average pore diameter of from about 20 to about 54 Å.

18. The method according to claim 14 wherein the activated carbon is derived from lignite or peat.

19. The method according to claim 1 wherein the activated carbon is impregnated with the molybdenum or tungsten component before the activated carbon is impregnated with the cobalt or nickel component.

20. The method according to claim 1 wherein the metal impregnated activated carbon further consists essentially of (a) the molybdenum or tungsten component and (b) the cobalt or nickel component on the activated carbon and wherein the catalyst composition is recovered by steaming the catalyst composition to remove at least a portion of any hydrocarbon adsorbed thereon and wherein the catalyst composition is partially gasified by contacting the catalyst composition with a stream comprising oxygen.

* * * * *